Dec. 26, 1922.
R. LITTLEFIELD.
Spacer Device for Beehive Frames.
Filed Mar. 13, 1922.
1,440,090
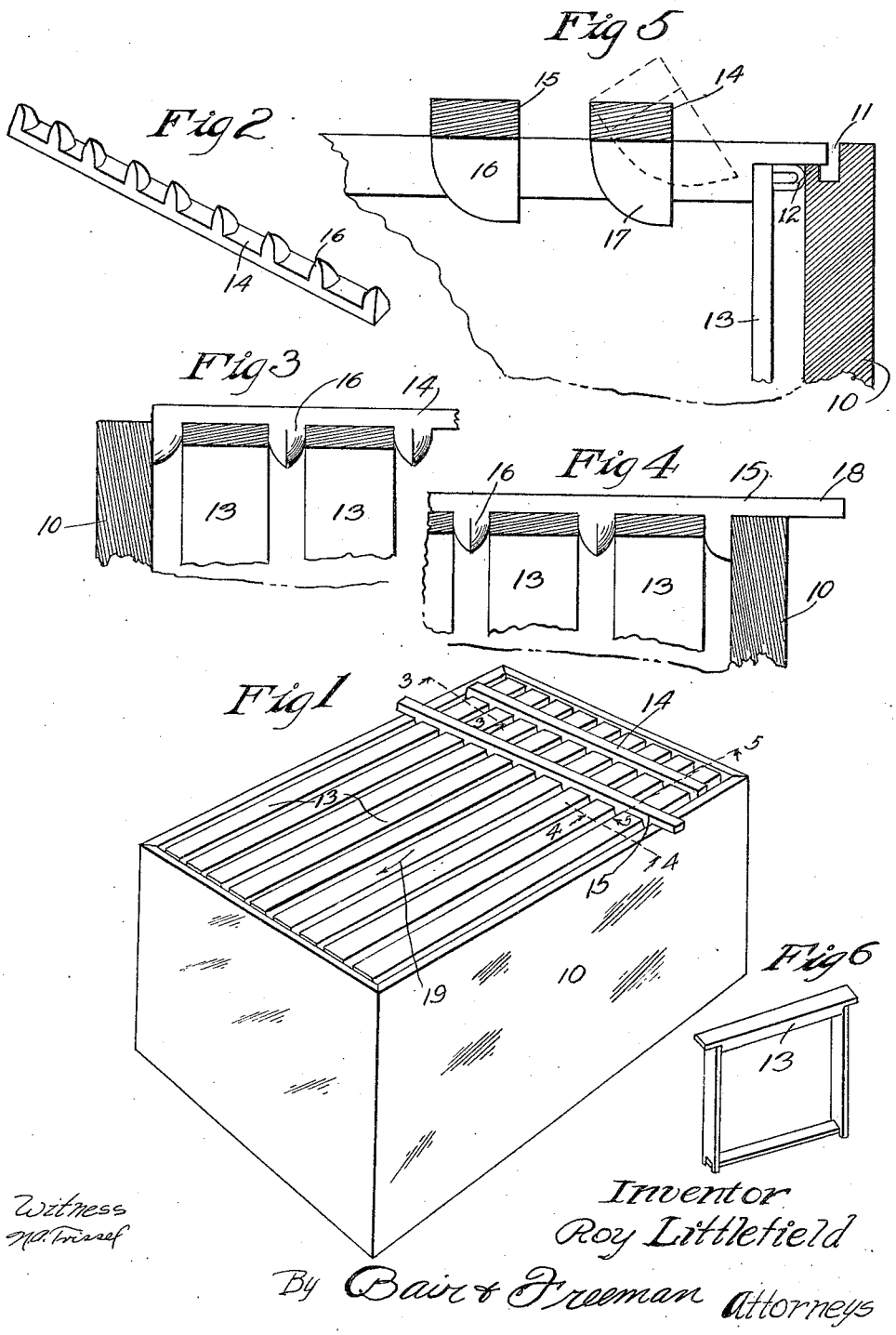
Inventor
Roy Littlefield
By Bair & Freeman Attorneys
Witness Patented Dec. 26, 1922.

1,440,090

UNITED STATES PATENT OFFICE.

ROY LITTLEFIELD, OF EXIRA, IOWA.

SPACER DEVICE FOR BEEHIVE FRAMES.

Application filed March 13, 1922. Serial No. 543,291.

*To all whom it may concern:*

Be it known that I, ROY LITTLEFIELD, a citizen of the United States, residing at Exira, in the county of Audubon, in the State of Iowa, have invented a certain new and useful Spacer Device for Beehive Frames, of which the following is a specification.

The object of my invention is to provide spacer devices for bee hive frames, which are of simple, durable and comparatively inexpensive construction.

More particularly my invention relates to a device wherein the frames for containing honey within the supers of the bee hives, may be easily and equally spaced apart.

In this connection it may be mentioned that the honey is deposited by the bees in frames, which are hung within the supers. It is extremely necessary to space the frames from the walls of the supers and to space the frames from each other in order to prevent the bees from gluing the frames together or so connecting the frames together, by the honey and wax, as to make it impossible to easily remove each of the frames.

A further object of my invention is to provide a pair of members having spaced projections thereon, arranged to be received between the frames for causing them to be equally spaced from each other.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of a super of a bee hive with my improved spacer devices shown therein.

Figure 2 is a perspective view of one of my spacer devices.

Figure 3 is a sectional view taken on line 3—3 of Figure 1.

Figure 4 is a sectional view taken on line 4—4 of Figure 1.

Figure 5 is a sectional view taken on line 5—5 of Figure 1; and

Figure 6 is a perspective view of one of the honey containing frames.

In the accompanying drawings, I have used the reference numeral 10 to indicate generally a super which has its end walls provided with rabbets 11 so as to form a shoulder 12. Designed to rest upon the shoulder 12 are the honey containing frames 13 which have the ends of the upper portion project outwardly from both the sides of the frame, whereby the sides of the frame will be spaced from the end walls of the super 10.

A number of frames 13 are placed within the super 10, and my invention, which I will now describe is designed to position the frames relative to each other. I provide a pair of members 14 and 15 which are used for spacing the frames apart. The member 14 and the member 15 are each provided with a number of spaced projections 16. Each of the spaced projections are curved from front to rear as at 17.

The projections also have their sides curved so that they will be substantially wedge shaped. The two end projections on each of the members 14 and 15 have one of their sides flat so as to rest against the side walls of the super 10.

After the frames 13 have been placed within the super 10, and it is desired to properly space them apart, the member 14 is slightly tilted as shown in dotted lines of Figure 5 of the drawings, and then by swinging the member 14, it is brought to position shown in Figure 1 of the drawings. The tilting of the member 14 permits the sharp edges of the projection 16 to first be received between the frames 13. The turning of the member 14 forces the frames 13 to be spaced equally apart, due to the fact that the projection 16 will be received therebetween.

The member 15 has its ends project out beyond the side walls of the super 10, so as to form the hand engaging portions 18. In the practical operation of my spacer device, the member 14 is placed in position near one end of the frames 13. The member 15 is then placed adjacent to the member 14 and drawn in the direction indicated by the arrow 19, to the opposite ends of the frames 13. Each of the ends of the frames 13 will then be properly spaced apart.

The members 14 and 15 will then be removed and the ordinary cover for the super is placed in position. The arrangement for spacing the frames 13 is very desirable, due to the fact that no permanent cleats can be used for spacing the frames, due to the fact that the bees would glue the cleats and frames together with the honey or wax.

After the frames 13 are once properly set there is no movement which might cause the frames to be shifted. The spacer devices 14 and 15 may be placed at each end of the frames 13 when the honey containing frames and supers are moved from place to place, as is necessary when the honey is to be extracted from the frames. The spacing device will prevent the frames from coming together when they are filled with honey while being transported.

It will be seen that my spacing devices are very simple and yet are very effective for properly spacing the honey containing frames apart.

Some changes may be made in the construction and arrangement of the parts of my device without departing from the real spirit and purpose of my invention and it is my intention to cover by my claims, any modified forms of structure of use of mechanical equivalents, which may be reasonably included within their scope.

I claim as my invention:

1. In combination with a bee hive super and honey containing frames arranged loosely therein, means for equally spacing said frames from each other, said means including a pair of members having projections formed on one of their sides, whereby one of said members may be placed at one end of the frames with the projections received therebetween and the other capable of being drawn from one end of said frames to the opposite end thereof for equally spacing the frames, one of said members having its ends project out beyond the sides of the super for serving as handles.

2. In combination with a bee hive super and honey containing frames arranged loosely therein, means for equally spacing the frames from each other, said means including spaced projections formed on one of their sides, said projections being curved from front to rear and from side to side so as to form wedge shaped portions, said projections being designed to be received between the honey containing frames for normally spacing them apart, one of said pair of members having its ends project out beyond the sides of the super whereby they may serve as hand engaging elements for permitting it to be drawn lengthwise of the frames for equally spacing them as specified.

Des Moines, Iowa, February 15, 1922.

ROY LITTLEFIELD.